Patented Oct. 18, 1938

2,133,791

UNITED STATES PATENT OFFICE 2,133,791

METHOD OF PRESERVING RUBBER

Winfield Scott, Akron, Ohio, assignor to Wingfoot Corporation, Wilmington, Del., a corporation of Delaware No Drawing. Application June 23, 1936, Serial No. 86,892

15 Claims.  (Cl. 18—50)

This invention relates to the preservation of rubber and rubber-like materials, being more particularly concerned with age resisters which are ketone derivatives of acid-converted ketone-amines. The invention also embraces rubber products obtained by the process set forth herein.

Ketones and aromatic amino compounds have previously been reacted and then converted by acid treatment to produce anti-oxidants for use in rubber. Also, such acid-converted compounds have been treated with formaldehyde and the ultimate product incorporated in rubber. It has now been found that acid-converted ketone-amine reaction products may be treated with additional ketone, either the same ketone which has been combined with the amine, or another, to secure products which have improved rubber-preserving characteristics. While both aliphatic and aromatic ketones may be used, aliphatic ketones are preferred as giving the best results in the final product.

An effective age resister can thus be obtained by reacting aniline and acetone, rearranging or converting this by treatment with hydrochloric acid, neutralizing and then reacting with additional acetone in the presence of iodine or other catalyst. The product is of unknown constitution but it can be said that the preliminary reaction between aniline and acetone differs from that between aniline hydrochloride and acetone, or, in other words, the reaction under neutral conditions differs from that under acid conditions which yield what is probably the hydrochloride of alpha-gamma-dimethyl quinoline.

The procedure for preparing the age resisters is fairly general in its application and can be carried out with various aryl amines. For example, the following primary aromatic amines may be used: aniline, alpha naphthylamine, beta naphthylamine, toluidines, xylidines, para amino benzyl aniline, para phenylene diamine and its isomers, meta toluylene diamine and its isomers, naphthalene diamines, etc.

Secondary amines may also be used, such as diphenylamine, dinaphthylamine, phenyl alpha naphthylamine, phenyl beta naphthylamine, diphenyl para phenylene diamine and its isomers, phenyl tolyl amines, etc. Mixtures of amines may also be treated with the ketone, such as a mixture of phenyl beta naphthylamine and di-para phenylene diamine.

The ketone used for reaction with the aromatic amine or with the acid-converted product may be, among others, acetone, diethyl ketone, methyl ethyl ketone, diisobutyl ketone, methyl isopropyl ketone, methyl isobutyl ketone, dipropyl ketone, dibutyl ketone, diisopropyl ketone, acetophenone, benzophenone, benzal acetone and aldol acetone. One of these may be used in both stages of the process or one ketone may be used in the first stage and another ketone in the last stage.

Hydrochloric acid has been mentioned as the converting agent but it will be obvious that other non-oxidizing mineral acids, such as sulphuric and hydrobromic acids, may also be used, hydrochloric acid being, however, the most suitable. The iodine used as a condensing agent during the reaction of the final portion of ketone may be replaced by other catalysts such as hydriodic acid, zinc chloride, sulphuric acid and the like. In this final reaction with ketone, a dehydrating agent, such as $CaCl_2$, should preferably be present also.

As illustrative of the process of preparation, the following examples are given:

Example 1

In the preparation of the acetone reaction product of acid-converted acetone-anil, 283 grams of the acetone-anil is treated with 150 cc. of concentrated hydrochloric acid and digested on the steam bath for approximately 72 hours, after which the acid is neutralized with sodium hydroxide solution. Thereupon, 113 grams of this acid-treated and neutralized material is added to 100 grams of acetone and 1 gram of iodine and heated in an autoclave for a period of 5 hours at a temperature of 200–225° C. After removing the unreacted acetone, the crude material weighed 141.5 grams, indicating that reaction with the additional acetone had taken place. Computation indicates that the converted acetone-anil reacted with one molecule of acetone. The crude product was subjected to vacuum distillation at 8 mm. pressure and 85.5 grams of material, distilling between 125°–305° C., was obtained as a rather thick oily liquid. This was reserved for testing in rubber.

Example 2

In another preparation of the acetone reaction product of acetone-anil, the same procedure is followed and, in this instance, 102 grams of the acid-treated anil showed a weight gain of 22.5 grams upon reaction with acetone, as compared with a calculated amount of 22.9 grams, thus indicating that one molecule of acetone was involved in the reaction. The product was not purified, before testing, other than by the removal of excess acetone, water, etc.

Example 3

In this example, two different ketones were made use of, the starting material acetone-alpha naphthil prepared from acetone and a naphthyl amine, being treated with concentrated hydrochloric acid and then neutralized. 50 grams of this rearranged material is then autoclaved with 300 grams of the other ketone, methyl ethyl ketone, 5 grams of iodine and 30 grams of calcium chloride, for a period of 8 hours at a temperature of 250° C. The calcium chloride is used as a dehydrating agent. When distilled under reduced pressure, 82.5 grams of a product distilling between 187° and 203° C. at 5 mm. is obtained and used in tests.

*Example 4*

Another product involving two different ketones is the reaction product of methyl isobutyl ketone and acid-converted acetone alpha naphthil. The acetone alpha naphthil, described above, is treated with hydrochloric acid and neutralized. To 80 grams of the acid-converted material is then added 42 grams of methyl isobutyl ketone and 3 grams of iodine and the whole heated for 8 hours at 295° C. The final product is isolated by distillation under reduced pressure.

As illustrative of the reaction as applied to secondary amines, the following is given:

*Example 5*

To prepare the acetone reaction product of the acid-converted material from the condensation of acetone and diphenylamine, the acid-conversion product is first obtained by suitable treatment of the acetone-diphenyl amine with hydrochloric acid. This acid conversion product is a solid, 185 grams of which is charged into an autoclave with 300 cc. of acetone, 5 grams of iodine and 25 grams of calcium chloride. The contents of the autoclave are heated to a temperature of 250° C. for a period of 8 hours. After removal of acetone, water, etc. the crude product weighed 249 grams. This product was then fractionated by vacuum distillation and the first fraction coming over, obtained at 7 mm. pressure over a distilling range of 190–250° C., was tested in rubber.

*Example 6*

In this example, an age-resister was prepared from a mixture of secondary aryl amines. To 197.5 grams of phenyl beta naphthylamine and 52 grams of diphenyl para phenylene diamine are added 232 grams of acetone and 2.5 grams of iodine. The mixture is heated in the autoclave at 230° C. for 25½ hours. The product is separated from excess acetone and is then digested with concentrated hydrochloric acid. After neutralizing with sodium hydroxide solution and drying, the product is dissolved in an excess of acetone and autoclaved at a temperature of 275–300° C. for 8 hours. After removal of excess acetone, water and the like, the material is ready for use in rubber.

Other products obtained by the procedure herein illustrated are the acetone reaction product of acid-converted acetone p-tolil, the acetone reaction product of converted acetone alpha naphthil and of beta naphthil, the methyl ethyl ketone reaction product of converted acetone-beta naphthil, and the methyl ethyl ketone reaction product of converted acetone diphenylamine.

It will be understood that the foregoing examples are merely illustrative of the invention and no limitation is implied thereby. Considerable variation can be made as regards time, temperature, catalysts, dehydrating agents, etc., and the applicability of the reaction to various amines, both primary aryl amines and secondary aryl amines, has been previously pointed out. Generally the amines of the benzene and naphthalene series are found to give the most useful products, but other aromatic amines may also be employed, such as amino biphenyl, amino phenanthrene, amino carbazol, etc. While it is not desired to limit the process of preparation of the age resisters to any fixed set of conditions, due to the fact that these should be varied to accommodate the charactertistics of the various starting materials and intermediate products, it is found that, in general, the ketone-amine, a known product whose preparation need not be described in detail, should be treated with a strong non-oxidizing mineral acid, such as hydrochloric acid, in excess, some two or three molecular equivalents, more or less, of acid being present to one mol of ketone-amine reaction product. The acid treatment is carried out at a slightly elevated temperature, say that of the steam bath, for several hours. The reaction of the neutralized conversion product with additional ketone is preferably carried out at temperatures ranging between 150° and 300° C., and preferably between 200° to 250° C., and the mono ketone should be present in at least the mono molecular equivalent of the ketone-amine conversion product, considering this latter to be the reaction product of one mol of amine and two mols of ketone, although the exact composition is not known. However, an excess of the ketone will ordinarily be used since the unreacted portion can be distilled off.

The products obtained in the foregoing examples were tested in a rubber stock having the following composition:

| | Parts by weight |
|---|---|
| Extracted pale crepe | 100.0 |
| Zinc oxide | 5.0 |
| Sulphur | 3.0 |
| Stearic acid | 1.5 |
| Hexamethylenetetramine | 1.0 |
| Age resister | 1.0 |

Rubber samples so made up and containng one part of age resister to 100 of rubber were subjected to accelerated ageing for 6 days in an oxygen bomb at a temperature of 50° C. and a pressure of 150 pounds per square inch, the tests being carried out on samples which had been vulcanized for 50 minutes at 285° F.

The following comparison of the physical properties of unaged and aged samples was obtained:

| | Tensile kgs/cm$^2$ | Elong. | Modulus kgs/cm$^2$ | | Tensile ratio |
|---|---|---|---|---|---|
| | | | 500% | 700% | |
| *Example 1* | | | | | |
| Unaged | 128 | 805 | 20 | 70 | |
| Aged | 128 | 770 | 23 | 83 | 100% |
| *Example 2* | | | | | |
| Unaged | 124 | 820 | 19 | 61 | |
| Aged | 129 | 790 | 21 | 73 | 104% |
| *Example 3* | | | | | |
| Unaged | 88 | 650 | 31 | ---- | ---- |
| Aged | 110 | 775 | 21 | 73 | |
| *Example 4* | | | | | |
| Unaged | 125 | 815 | 19 | 64 | |
| Aged | 110 | 770 | 21 | 73 | 88% |
| *Example 5* | | | | | |
| Unaged | 107 | 805 | 16 | 56 | |
| Aged | 108 | 775 | 20 | 69 | 100% |
| *Example 6* | | | | | |
| Unaged | 116 | 825 | 17 | 55 | |
| Aged | 128 | 785 | 22 | 78 | 110% |

It will be observed from the data given above that the tensile ratio, which is the proportion of the original tensile strength of the cured sample remaining after ageing, is very good, thus indicating that rubber stocks treated with the present age-resisters will stand up well against the deteriorating influences of heat, light, and weathering. The compositions also impart resistance to the breaking-down effect of flexing, which is an important consideration under present conditions of use under which rubber tires are subjected to more flexing due to pressures and diameters used and to higher driving speeds.

The age resisters may be incorporated in the rubber before vulcanization or may be applied to the surface of the article, although the latter method is not as effective. In general, the rubber may be treated with the age-resister at any stage of the preparation of the rubber product which may be found convenient and suitable.

The term "rubber" as used herein is intended to include caoutchouc, balata, reclaimed rubber, synthetic rubber and other rubber-like products subject to ageing, whether vulcanized or not and regardless of association with fillers, pigments, vulcanizing and accelerating agents.

Although the preferred embodiment thereof has been described above and illustrated in detail, it will be apparent that the invention is not limited by such description but that various modifications may be made therein without departing from its scope. Accordingly, it is intended that the invention shall be limited only by the accompanying claims and that these shall set forth all features of patentable novelty inherent therein.

What I claim is:

1. A method of preserving rubber which comprises treating the same with a product obtainable by first reacting an aryl amine with a ketone under substantially neutral conditions, next heating this reaction product in an acid medium to convert the same and then treating the conversion product with at least a molecular equivalent of additional ketone at a temperature between about 150° and 300° C.

2. A method of preserving rubber which comprises treating the same with a product obtainable by first reacting a primary aryl amine with a ketone under substantially neutral conditions, next heating this reaction product in an acid medium to convert the same, neutralizing, and then treating the conversion product with at least a molecular equivalent of additional ketone at a temperature between about 150° and 300° C.

3. A method of preserving rubber which comprises treating the same with a product obtainable by first reacting a secondary diaryl amine with a ketone under substantially neutral conditions, next heating this reaction product in an acid medium to convert the same and then treating the conversion product with at least a molecular equivalent of additional ketone at a temperature between about 150° and 300° C.

4. A method of preserving rubber which comprises treating the same with a product obtainable by first reacting aniline with a ketone under substantially neutral conditions, next heating this ketone-anil in an acid medium to convert the same and then treating the conversion product with at least a molecular equivalent of additional ketone at a temperature between about 150° and 300° C.

5. A method of preserving rubber which comprises treating the same with a product obtainable by first reacting aniline with acetone under substantially neutral conditions, next heating the acetone-anil in an acid medium to convert the same and then treating the conversion product with at least a molecular equivalent of additional acetone at a temperature between about 150° and 300° C.

6. A method of preserving rubber which comprises treating the same with a product obtainable by converting an aryl amine-ketone reaction product prepared under substantially neutral conditions, in an acid medium at the temperature of the steam bath, neutralizing and further reacting the conversion product with at least a molecular equivalent of a ketone at a temperature of about 150° to 300° C. in the presence of a catalyst.

7. A method of preserving rubber which comprises treating the same with a product obtainable by converting a primary aryl amine-ketone reaction product prepared under substantially neutral conditions in an acid medium at the temperature of the steam bath, neutralizing and further reacting the conversion product with at least a molecular equivalent of a ketone at a temperature of about 150° to 300° C.

8. A method of preserving rubber which comprises treating the same with a product obtainable by converting a secondary aryl amine-ketone reaction product prepared under substantially neutral conditions in an acid medium at the temperature of the steam bath, neutralizing and further reacting the conversion product with at least a molecular equivalent of a ketone at a temperature of about 150° C. to 300° C.

9. A method of preserving rubber which comprises treating the same with a product obtainable by converting an acetone-anil, prepared under substantially neutral conditions, in a strong non-oxidizing mineral acid medium at the temperature of the steam bath, neutralizing and further reacting the conversion product with at least a molecular equivalent of acetone at a temperature of about 150° to 300° C.

10. A method of preserving rubber which comprises treating the same with a product obtained by reacting an acetone-anil, prepared under substantially neutral conditions, in a hydrochloric acid solution at the temperature of the steam bath, neutralizing and further reacting the conversion product with at least a molecular equivalent of acetone at a temperature of about 150° to 300° C.

11. A method of preserving rubber which comprises treating the same with a mol for mol ketone reaction product of an acid-converted ketone-aryl amine prepared under substantially neutral conditions.

12. A method of preserving rubber which comprises treating the same with a product obtainable by reacting at least a molecular equivalent of a ketone with an acid-converted ketone-aryl amine, prepared under substantially neutral conditions, at a temperature between 200° and 250° C. in the presence of a catalyst.

13. Rubber which has been preserved by treating the same with a product obtainable by first reacting an aryl amine with a ketone under substantially neutral conditions, next heating this reaction product in an acid medium to convert the same and then treating the conversion product with at least a molecular equivalent of additional ketone.

14. Rubber which has been preserved by incorporating therein a product obtainable by heating an acetone-aryl amine reaction product prepared under substantially neutral conditions, in an acid medium at the temperature of the steam bath to convert the same, neutralizing, and then further reacting the conversion product with at least a molecular equivalent of a ketone at a temperature of about 150° to 300° C.

15. Rubber which has been preserved by treating the same with a product obtained by heating an acetone-anil, prepared under substantially neutral conditions in a hydrochloric acid solution at the temperature of the steam bath to convert the same and then further reacting the conversion product with at least a molecular equivalent of acetone at a temperature of about 100° to 300° C.

WINFIELD SCOTT.

CERTIFICATE OF CORRECTION.

Patent No. 2,133,791.                              October 18, 1938.

WINFIELD SCOTT.

It is hereby certified that error appears in the printed specification of the above numbered patent requiring correction as follows: Page 3, second column, line 73, claim 13, strike out the period and insert instead at a temperature between about 150° and 300°C.; and that the said Letters Patent should be read with this correction therein that the same may conform to the record of the case in the Patent Office.

Signed and sealed this 27th day of December, A. D. 1938.

Henry Van Arsdale (Seal)                                      Acting Commissioner of Patents.